United States Patent

Grossmann et al.

[11] 3,775,056
[45] Nov. 27, 1973

[54] DISPERSE DYES AND SULFOSUCCINATE SEMI ESTERS OF POLYALKYLENE GLYOL ETHERS OF ALKYLPHENOLS OR PHENOL-FORMALDEHYDE CONDENSATES

[76] Inventors: Max Grossmann; Karl-Hermann List, both of Frankfurt/Main; Heinz Uhrig, Steinbach/Taunus, all of Germany

[22] Filed: June 29, 1972

[21] Appl. No.: 267,646

[30] Foreign Application Priority Data
June 30, 1971 Germany.................. P 21 32 403.8

[52] U.S. Cl............................ 8/169, 8/173, 8/93, 8/79
[51] Int. Cl............................... D06p 5/04
[58] Field of Search................... 8/173, 93

[56] References Cited
FOREIGN PATENTS OR APPLICATIONS
1,576,874   8/1969   France.................................. 8/173
44/13792    6/1969   Japan.................................... 8/173

Primary Examiner—Donald Levy
Attorney—Henry W. Koster

[57] ABSTRACT

A dispersion of a disperse dyestuff which contains, as the dispersing agent, a sulfosuccinic acid semi-ester of the formula $$A-(X-O)_n-CO-B \qquad (1)$$

wherein B is

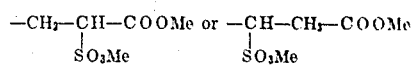

A is an alkylphenoxy of the formula

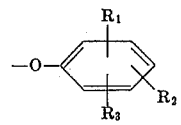

or a group of the formula

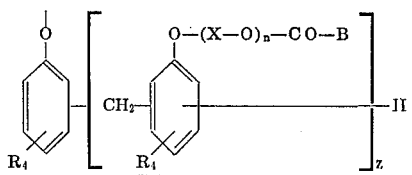

X is ethylene or propylene, $R_1$ is saturated alkyl having from four to 14 carbon atoms, $R_2$ and $R_3$ each are hydrogen or saturated alkyl having from six to 14 carbon atoms, $R_4$ is a saturated alkyl of six to 14 carbon atoms, $R_4$ is a saturated alkyl of 6 to 14 carbon atoms, $n$ is an integer from 2 to 25, $z$ is an integer from 1 to 9 and Me is hydrogen, alkali metal or an alkaline earth metal ion. These dispersing agents show a distinctly improved dispersing effect and effect a higher tinctorial strength so that smaller amounts of the dispersing agent are necessary as compared with other dispersing agents known hitherto.

3 Claims, No Drawings

DISPERSE DYES AND SULFOSUCCINATE SEMI ESTERS OF POLYALKYLENE GLYOL ETHERS OF ALKYLPHENOLS OR PHENOL-FORMALDEHYDE CONDENSATES

The present invention relates to dyestuff dispersions.

The requirements as to the finish of pigments and textile dyes, especially disperse dyes for synthetic resins, have considerably increased in recent years by the development of new dyeing methods. Especially high requirements as to the grade of dispersion and the stability of the dispersions are to be met in the dyeing of wound packages.

Because of the often very different properties of the individual dyestuffs, especially with regard to their solubility in water, and the varying size of the dyestuff particles, the efficiency of the dispersing agents is very often limited to individual products. So, for example, some lignin sulfonates are not able to provide a sufficient thermal stability of the dispersions. Other disperse agents have the drawback that they are only efficient in the alkaline range or that they themselves dye the fibers, thus hampering the dyeing of fair shades. Many other dispersing agents impair the dispersing and dyeing process by their tendency to foaming.

The present invention provides dyestuff dispersions which contain as dispersing agents sulfosuccinic acid semi-esters of the general formula

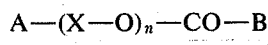

(1)

wherein B is a group of the formula

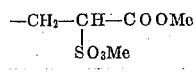

or of the formula

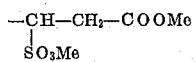

A represents an alkylphenoxy group of the formula

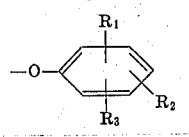

or a group of the formula

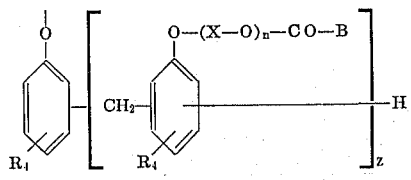

X represents an ethylene group or a propylene group, $R_1$ represents a saturated alkyl radical having from four to 14 carbon atoms, $R_2$ and $R_3$ each represents a hydrogen atom or a saturated alkyl radical having from four to 14 carbon atoms, $R_4$ represents a saturated alkyl radical having from six to 14 carbon atoms, $n$ is an integer from 2 to 25, preferably from 3 – 15, $z$ is an integer from 1 to 9 and Me represents a hydrogen atom, an alkali metal atom or an equivalent of an alkaline earth metal atom.

This invention also provides a process for the manufacture of those dyestuff dispersions.

The sulfosuccinic acid semi-esters of formula (1) may be obtained by oxalkylating the mononuclear or multinuclear alkyl phenols derived therefrom, reacting the oxalkylates so obtained with maleic acid anhydrides to yield the maleic acid semi-esters and then adding to the latter alkali metal or alkaline earth metal sulfites.

Suitable starting products are multinuclear alkyl phenols (novolacs) obtained by acid condensation of monoalkyl phenols, for example, octyl, nonyl, dodecyl phenol or mixtures thereof with formaldehyde in a molar ratio of from 2 : 1 to 10 : 9. The formaldehyde may be used as aqueous solution or as paraformaldehyde. As catalysts, there may be used, because of their volatility, mineral acids, such as sulfuric acid, phosphoric acid or, preferably, hydrochloric acid in a concentration of from 0.1 to 5 percent by weight. The condensation is carried out at a temperature of from 20° to 150°C, preferably from 80° to 130°C under nitrogen atmosphere. The water which is present after the condensation must be distilled off, ultimately under reduced pressure (50 mm mercury) until the water content in the resine is below 0.3 percent.

These novolacs are relatively brittle, limpid resins of yellow-brown shade in the form of blocks. They consist of mixtures of alkyl phenols linked by methylene bridges. Their constitution depends above all from the ratio of alkyl phenol to formaldehyde.

The oxalkylation of the mononuclear and multinuclear alkyl phenols is effected with alkylene oxides, for example, 1,2-propylene oxide or, preferably, with ethylene oxide, according to known methods, using alkali metal hydroxides or alkoxides preferably as catalysts, at a temperature within the range of from 100° to 200°C, preferably of from 140° to 170°C. The alkylene oxide is chosen in such an amount that from 2 to 25 moles of it are introduced per phenolic hydroxyl group each.

As alkali metal hydroxides there may be used potassium hydroxide or, preferably, sodium hydroxide, as alkali metal alkoxides sodium methylate or ethylate in a concentration which should be within the range of from 0.05 to 1.0 percent by weight, calculated on the phenol, at the beginning of the oxalkylation. The oxalkylation can be carried out pressureless or in pressure vessels with propylene oxide or, preferably, ethylene oxide or mixtures of both compounds; the alkylene oxide may be introduced in gaseous or liquid form.

The reaction of the oxalkylates so prepared with maleic acid anhydride to yield the maleic acid semi-esters is carried out by mixing the components and stirring the mixture at a temperature within the range of from 20° to 100°C, preferably from 40° to 80°C, in the presence of alkali metal hydroxides which should be in a concentration of from 0.05 to 1.5 percent by weight, calculated on the total mixture. Since maleic acid anhydride has a tendency to sublimation it is advantageous to work in pressure vessels under a pressure of from 0.2 to 1.0 atmospheres gauge of nitrogen or air and to mix thoroughly, as at the beginning of the reaction the molten maleic acid anhydride is not easily miscible with the oxalkylates. The amount of the maleic acid anhydride can be measured in such a manner that the totality of, or only a part, but one at least of the oxalkylate/hydroxyl end groups is reacted.

The conversion of the maleic acid semi-ester compounds into the corresponding sulfosuccinic acid semi-esters is effected after the addition of aqueous solutions of sulfites or hydrogen sulfites. The amount of alkali metal or alkaline earth metal sulfites or bisulfites or pyrosulfites introduced per group of maleic acid semi-ester is within the range of from 1.0 to 1.5, preferably from 1.05 to 1.1 moles, calculated as sulfurous acid. The sulfites are especially convenient as they lead to the formation of the Di-salts of the sulfosuccinic acid semi-esters.

The amount of water added may be within the range of from 50 to 85 percent by weight, calculated on the total solution or mixture and depends on the solubility of the sulfosuccinic acid semi-ester salts and on the viscosity of the solutions. The reaction temperatures are within the range of from 20° to 100°C, preferably from 40° to 80°C. The 15 to 50 percent aqueous solutions can be used directly. The water may, however, also be eliminated from the solutions by spray-drying before being further used.

To prepare the dispersions, the 15–50 percent aqueous solutions formed when preparing the sulfosuccinic acid semi-esters can be used directly. But it is also possible first to eliminate the water from these solutions, for example, by spray-drying. As dyestuffs, there may be used all sparingly soluble dyestuffs and pigments, such as vat dyestuffs and azo dyestuffs, especially disperse dyestuffs. These dyestuffs are stirred by means of a dissolver (impeller provided with a saw-tooth disk) as press cakes or, in some cases, also in dry form, with the dispersing agents or the aqueous solutions thereof using the slightest possible amount of water to yield a suspension which can be pumped, passed if necessary, over a corundum disk mill or similar colloid mills for homogenization, and then, generally, ground in a continuously operating stirrer mill using quarzite beads of a 1 – 3 mm diameter, if required, in several passages, until the desired grade of dispersion is obtained. After grinding, as well as with stirring, further additives of bactericides, extenders, for example, sugar, further dispersing agents and water may be used to obtain the final paste standard. For conversion into powder, a suitable paste is dried in the spray tower and then adjusted to standard conformity at dry state.

The ratio of dispersing agent to dyestuff powder may vary within wide limits and is, in general, within the range of from 0.3 to 10, preferably from 0.5 to 2 parts by weight of dispersing agent per one part of dyestuff powder.

As compared with the dispersing agent described in Fiat Final Report 1013, the dispersing agents of the present invention show a distinctly improved dispersing effect and lead to a higher tinctorial strength, so that smaller amounts of dispersing agent are sufficient to obtain stable dispersions. Since some dyestuffs and fibers are susceptible to the influence of alkali, the dispersing agents of the invention have the advantage, in contradistinction to most of the known anionic dispersing agents, that they are neutral, so that they can also be used for alkali-susceptible dyestuffs. It is also possible to combine dispersions which have been prepared with the dispersing agents of the invention, with other susceptible, soluble dyestuffs, for example, with reactive dyestuffs. The dispersing agents of the invention have also the advantage that they have a greatly reduced tendency to foaming which in the reverse case could heavily disturb the dispersing process. Their capability of soiling textiles is, likewise, very poor. Another advantage over known dispersing agents is their very good wetting property in the hot dyebath which can be demonstrated by the wetting times obtained according to German Industrial Standards DIN 53901 at 20°C and at 70°C. In the presence of other dispersing agents, the wetting as powder while stirring at room temperature is also improved in many cases. All these effects are specific and differ from dyestuff to dyestuff so that the following Examples can only illustrate the invention but are not intended to limit it. The examples show that the compounds of the invention are superior as to their dispersing property, their capability of improving the stability and their reduced tendency to soil the fiber.

The following Examples A and B first describe the preparation of the compounds which will later be examined as dispersing agents; the parts and percentages are by weight, unless otherwise stated:

EXAMPLE A (Sulfosuccinic acid semi-esters of oxalkylated-mononuclear alkyl phenols)

1 Mol of alkyl phenol was oxalkylated with $n$ mols of ethylene oxide in the presence of an alkaline catalyst and then quantitatively reacted with 1 mol of maleic acid anhydride at from 50°– 80°C while stirring. After dilution with water, 1.05 – 1.1 mols of sodium sulfite were added as aqueous solution at from 40°– 80°C within from 15 minutes to 2 hours while stirring and stirring was continued for 1 hour after the reaction mixture had become clearly water-soluble. The amount of water added in total was within the range of from 50 – 85 percent of the final solution. The yield was quantitative.

According to this process, the compounds indicated in the following Table had been prepared.

TABLE A

| Substance number | Starting phenols, type | Mol | Ethylene oxide, mol | Maleic acid anhydride, mol | Maleic acid semi-ester Calculation index $n_D^{25}$ | Acid number Found | Acid number Calculated | $Na_2SO_3 \cdot x_7H_2O$, mol |
|---|---|---|---|---|---|---|---|---|
| 1 | 2,4,6-tributylphenol | 1 | 7 | 1 | | | | 1.1 |
| 2 | Mononylphenol | 1 | 5 | 1 | 1.5008 | 120 | 104 | 1.1 |
| 3 | do | 1 | 9 | 1 | 1.4941 | 88 | 78.4 | 1.1 |
| 4 | Dinonylphenol (20% mononyl) | 1 | 6 | 1 | 1.4951 | 82.4 | 80.7 | 1.1 |
| 5 | do | 1 | 8 | 1 | 1.4929 | 74.0 | 71.7 | 1.1 |
| 6 | do | 1 | 10 | 1 | 1.4905 | 63.5 | 62.6 | 1.1 |
| 7 | do | 1 | 12 | 1 | 1.4873 | 58.5 | 57.5 | 1.1 |
| 8 | do | 1 | 15 | 1 | 1.4852 | 50.6 | 50.8 | 1.1 |

EXAMPLE B (Sulfosuccinic acid semi-ester of oxalkylated multinuclear alkyl phenols).

a. Preparation of novolacs $Z + 1$ mol(s) of alkyl phenol and $Z$ mol(s) of formaldehyde were mixed at room temperature and stirred under reflux at a temperature of from 95°– 106°C for 4 hours after having added 0.55 percent of concentrated hydrochloric acid (D 1,18), calculated on alkyl phenol, then the water was distilled off, ultimately under reduced pressure of 20 – 2 mm mercury.

b. Oxalkylation and preparation of sulfosuccinic acid semi-ester

1 Mol of novolac and 0.2 percent of NaOH calculated on novolac was oxalkylated at a temperature of from 140°– 170°C with $(z+1)n$ mols of ethylene oxide, esterified with $z + 1$ or less mols of maleic acid semi-ester and the maleic acid semi-esters so obtained were reacted with sodium sulfite to yield the corresponding sulfosuccinic acid semi-ester salt in an analogous manner as described in Example A.

The compounds so obtained are summarized in the following Table B.

stuff was more or less well dispersed. The amount necessary for this purpose may be easily evaluated, for example, on running samples, (running out of 1 ml of the dispersion on a filter paper) or under the microscope and may be compared with other dispersing agents. When the dispersions were allowed to stand, especially at elevated temperature and were reexamined after a longer period of time, it could be seen how the dispersing agents exerted their stabilization properties.

The testing method described above was carried out at pH 1 – 2.

Testing method 2

A corresponding examination of the dispersing agents in the alkaline range at pH 11–12 was effected by saponification of the dyestuff referred to in Example 4 of British Pat. No. 998,917, the coupling product of 2-bromoaniline-4$\beta$-hydroxyethylsulfonic acid ester with diphenyl amine.

Testing method 3

In the neutral range, at pH 6–7, the dispersing agents can be examined by coupling the diazonium salt of 2-methyl-5-chloroaniline with $\beta$-oxynaphthoic acid-2-methyl-anilide also in the presence of different dispersing agents.

TABLE B

Starting novolac $$\left[ \begin{array}{c} OH \\ \diagup\!\!\!\diagdown \\ R_4 \end{array} \!\!-\! CH_2 \!-\! \begin{array}{c} OH \\ \diagup\!\!\!\diagdown \\ R_4 \end{array} \right]_z \!\!-\! H$$

| Substance number | $R_4$ | $z$ | Mol | Ethylene oxide, mol | Maleic acid anhydride, mol | Maleic acid semi-ester Acid number $n_D^{25}$ | Maleic acid semi-ester Acid number Found | Maleic acid semi-ester Acid number Calculated | $Na_2SO_3 \times 7H_2O$, mol |
|---|---|---|---|---|---|---|---|---|---|
| 9 | $C_9H_{19}$ | 1 | 1 | 6 | 2 | 1.5153 | 137.0 | 122.5 | 2.2 |
| 10 | $C_9H_{19}$ | 1 | 1 | 12 | 2 | 1.5078 | 96.7 | 95.4 | 2.2 |
| 11 | $C_9H_{19}$ | 1 | 1 | 12 | 1 | 1.5025 | 50.8 | 50.7 | 1.1 |
| 12 | $C_9H_{19}$ | 1 | 1 | 21 | 2 | 1.4987 | 79.2 | 70.8 | 2.2 |
| 13 | $C_9H_{19}$ | 2 | 1 | 6 | 3 | 1.5252 | 144.0 | 135.8 | 3.3 |
| 14 | $C_9H_{19}$ | 2 | 1 | 9 | 3 | 1.5208 | 126.3 | 122.3 | 3.3 |
| 15 | $C_9H_{19}$ | 2 | 1 | 12 | 3 | 1.5156 | --- | --- | 3.3 |
| 16 | $C_9H_{19}$ | 2 | 1 | 18 | 3 | 1.5098 | 97.2 | 94.8 | 3.3 |
| 17 | $C_9H_{19}$ | 2 | 1 | 21 | 3 | 1.5075 | 99.1 | 88.4 | 3.3 |
| 18 | $C_9H_{19}$ | 2 | 1 | 18 | 2 | 1.5089 | 67.8 | 67.2 | 2.2 |
| 19 | $C_9H_{19}$ | 3 | 1 | 9 | 4 | 1.5254 | 141.0 | 131.0 | 4.4 |
| 20 | $C_9H_{19}$ | 3 | 1 | 12 | 4 | 1.5222 | 123.0 | 121.5 | 4.4 |
| 21 | $C_9H_{19}$ | 3 | 1 | 15 | 4 | 1.5190 | 113.5 | 116.5 | 4.4 |
| 22 | $C_9H_{19}$ | 3 | 1 | 18 | 4 | 1.5168 | 108.8 | 106.4 | 4.4 |
| 23 | $C_9H_{19}$ | 8 | 1 | 54 | 9 | 1.5111 | 101.0 | 94.4 | 9.9 |
| 24 | $C_9H_{19}$ | 2 | 1 | 60 | 3 | 1.488 | 50.4 | 46.6 | 3.3 |
| 25 | $C_9H_{19}$ | 8 | 1 | 224 | 9 | (3) | 40.4 | 39.3 | 9.9 |
| 26 | $C_{12}H_{25}$ | 2 | 1 | 24 | 3 | 1.5050 | 76.6 | 77.5 | 3.3 |
| 27 | $C_9H_{19}$ | 2 | 1 | $\begin{Bmatrix}{}^1 6\ PO \\ 12\ 'A'O\end{Bmatrix}$ | 3 | 1.5056 | 89.1 | 88.9 | 3.3 |
| 28 | $C_9H_{19}$ | 2 | 1 | $\begin{Bmatrix}{}^2 6\ PO \\ 12\ 'A'O\end{Bmatrix}$ | 3 | 1.4992 | 90.5 | 90.5 | 3.3 |
| 29 | $C_8H_{13}$ | 4 | 1 | 27 'A'O | 5 | 1.5134 | 107.4 | 107.1 | 5.5 |

[1] First 6 moles of PO (propylene oxide), then 12 EO (ethylene oxide) (block-oxalkylate).
[2] Mixture of 6 PO and 12 EO oxalkylated (mixed oxalkylate) with statistical distribution of the PO and EO radicals.
[3] FP 34.5–35.5° C.

For the testing of the dispersing agents prepared according to the above Examples A and B, comparison product A is used which was prepared, according to the prescription given in FIAT Final Report 1013, from cresol, 2-naphthol-6-sulfonic acid, sodium sulfite and formaldehyde. To be able to give a uniform characterization of the dispersing property, the following testing methods have been used:

Testing method 1

A 0.2 percent solution of the leuco-tetrasulfuric acid ester salts of 3,3'-dichloroindanthrenazine was decomposed by sulfuric acid and nitrite while stirring thoroughly so that the insoluble dyestuff precipitated. In the presence of the dispersing agents to be tested the amount of which increased from test to test, the dye- Testing method 4

To carry out comparative grinding tests, about 4 g of dyestuff were ground with the dispersing agent to be examined, with water and 50 g of sili-quarzite-beads of 1 mm diameter by means of a two-disk stirrer, similar to the usual stirrers, in stirrer mills in a small cylinder provided with a laboratory stirring motor while cooling. The progress of the fine division was observed at regular intervals by running-out filter samples and microscopic examinations and was evaluated according to a 5-points'-scale (1 = very poor; 5 = very good). The stability upon storing can be evaluated after dilution of the samples to give the dyestuff concentration desired, storing of the samples at 50°C in the drying cabinet and repetition of the running-out samples after, for example, a 1, 3 and 6 weeks' storage.

The following Tables indicate as test results of tests Nos. 1 – 3 the ratio of dyestuff to dispersing agent at which a complete dispersion of the dyestuff, i.e., the complete running-out on the filter sample is just achieved. For testing method 4, the quality of the dispersion is described after the grinding period indicated which is of 3 hours at most. The surface-active properties of the dispersing agents used are indicated in the 4 columns following testing method 4.

The surface tension was determined in a 0.5 percent aqueous solution according to the ring removal method.

The wetting time according to DIN 53901 indicates the time until which a dry little cotton disk sinks down in a 0.2 percent solution of the dispersing agent at 20°C and at 70°C.

The foaming capacity was measured according to DIN Draft No. 53902 (method of Ross-Mills) also at a concentration of 0.2 percent.

The result is indicated in the Tables by the numbers 0 to 4 which have the following meaning:

0 = no foaming capacity;

1 = mean

2 = mean to medium

3 = medium

4 = heavy.

The data obtained by the testing methods are summarized in the following Table with reference to the compounds of Table A and B and to the comparison product A.

wherein B is

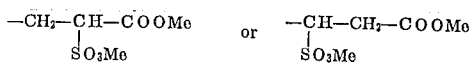

A is an alkylphenoxy of the formula

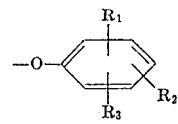

or a group of the formula

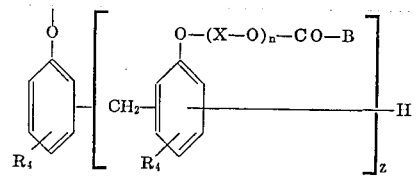

X is ethylene or propylene, $R_1$ is saturated alkyl having from four to 14 carbon atoms, $R_2$ and $R_3$ each are hydrogen or saturated alkyl having from 6 to 14 carbon atoms, $R_4$ is a saturated alkyl of six to 14 carbon atoms, $n$ is an integer from 2 to 25, $z$ is an integer from 1 to 9 and Me is hydrogen, alkali metal or an alkaline earth metal ion.

2. A dispersion as defined in claim 1 wherein the concentration of dispersing agent is from 0.3 to 10 parts by weight per 1 part by weight of dyestuff.

| Substance | Testing Method No. | | | Grinding time (h.) | Quality of dispersion | Surface tension (dyn/cm.) | Wetting time in sec. at— | | Foaming capacity |
|---|---|---|---|---|---|---|---|---|---|
| | 1 | 2 | 3 | | | | 20° C. | 70° C. | |
| | Dyestuff: dispersing agent | | | | | | | | |
| Comparison product A | 1:2 | 1:>2 | 1:0.4 | 3 | Satisfactory | 65 | | | 3 |
| Substance No.: | | | | | | | | | |
| 1 | 1:1 | 1:0.5 | 1:0.4 | 3 | Good | 31 | 7 | 6 | 3–4 |
| 2 | 1:0.5 | 1:0.5 | 1:0.4 | 3 | do | 33 | 30 | 70 | 3 |
| 3 | 1:0.5 | 1:0.5 | 1:0.4 | 3 | do | 39 | 85 | 35 | 1 |
| 4 | 1:0.5 | 1:1 | 1:0.4 | 3 | Satisfactory | 32 | 120 | 25 | 1 |
| 5 | 1:0.5 | 1:1 | 1:0.4 | 3 | Good | 34 | 170 | 80 | 3 |
| 6 | 1:0.5 | 1:1 | 1:0.25 | 3 | do | 39 | 190 | 40 | 3 |
| 7 | 1:0.5 | 1:1 | 1:0.4 | 3 | Nearly good | 38 | | 162 | 1 |
| 8 | 1:0.5 | 1:1 | 1:0.6 | 3 | Good | 35 | 240 | 60 | 4 |
| 9 | 1:0.5 | 1:1 | 1:0.13 | 0.8 | do | 41 | 180 | 45 | 2 |
| 10 | 1:0.5 | 1:1 | 1:0.13 | 2 | do | 42 | | 65 | 2 |
| 11 | 1:1.5 | 1:1 | 1:0.25 | 3 | do | 38 | | 96 | 1 |
| 12 | 1:0.5 | 1:0.5 | 1:0.13 | | | | | 90 | 0 |
| 13 | 1:0.5 | 1:1.5 | 1:0.07 | 1 | Good | 41 | | | 0 |
| 14 | 1:0.5 | 1:1 | 1:0.07 | 1 | do | 42 | | 480 | 0 |
| 15 | 1:0.5 | 1:1 | 1:0.13 | 1 | do | 39 | | 103 | 0 |
| 16 | 1:0.5 | 1:1 | 1:0.07 | 2 | do | 39 | | 137 | 0 |
| 17 | 1:0.5 | 1:1 | 1:0.13 | 2 | do | 39 | | 210 | 0 |
| 18 | 1:1 | 1:1.5 | 1:0.13 | 2 | | | | | |
| 19 | 1:1 | 1:0.75 | 1:0.13 | 2 | Good | 47 | | 131 | 0 |
| 20 | 1:0.5 | 1:1 | 1:0.07 | 1 | do | 43 | | 171 | 0 |
| 21 | 1:0.5 | 1:1 | 1:0.13 | 1 | do | 47 | | 210 | 0 |
| 22 | 1:0.5 | 1:0.5 | 1:0.13 | 1.5 | do | 47 | | 185 | 0 |
| 23 | 1:1 | 1:0.5 | 1:0.13 | 2 | do | 47 | | 330 | 0 |
| 24 | 1:0.5 | 1:0.5 | 1:0.13 | 1.5 | do | 48 | | 286 | 1 |

NOTE.—The stability on storage at 50° C. over 5 weeks was good to very good in the case of the dispersing agents of the invention while comparative product A clearly showed agglomerations.

We claim:

1. A dispersion of a disperse dyestuff which contains, as the dispersing agent, a sulfosuccinic acid semi-ester of the formula A—(X—O)$_n$—CO—B 3. A dispersion as defined in claim 1 wherein the concentration of dispersing agent is from 0.5 to 2 parts by weight per one part by weight of dyestuff.

* * * * *

UNITED STATES PATENT OFFICE
CERTIFICATE OF CORRECTION

Patent No. 3,775,056          Dated November 27, 1973

Inventor(s) Grossmann et al.

It is certified that error appears in the above-identified patent and that said Letters Patent are hereby corrected as shown below:

In the Heading, before "[22] Filed:" insert

--[73] Assignee: Farbwerke Hoechst Aktiengesellschaft vormals Meister Lucius & Bruning, Frankfurt/Main, Germany--

Signed and sealed this 4th day of June 1974.

(SEAL)
Attest:

EDWARD M. FLETCHER, JR.
Attesting Officer

C. MARSHALL DANN
Commissioner of Patents